United States Patent [19]
Welborn

[11] Patent Number: 5,393,118
[45] Date of Patent: Feb. 28, 1995

[54] ALUMINUM FRAMED VINYL CLOSURE FOR GOLF CARTS

[76] Inventor: Robert B. Welborn, 508 E. Barton St., Granbury, Tex. 76048

[21] Appl. No.: 214,046

[22] Filed: Mar. 15, 1994

Related U.S. Application Data

[63] Continuation-in-part of Ser. No. 959,388, Oct. 13, 1992, abandoned.

[51] Int. Cl.⁶ ............................................. B60J 5/06
[52] U.S. Cl. ................... 296/147; 296/146.5; 296/77.1; 280/DIG. 5
[58] Field of Search ............... 296/77.1, 83, 147, 138, 296/202, 146.2, 146.3, 146.5, 146.11; 280/DIG. 5; 49/502, 501; 160/368.1, 369

[56] References Cited

U.S. PATENT DOCUMENTS

| | | | |
|---|---|---|---|
| 2,460,399 | 2/1949 | Schassberger | 296/77.1 X |
| 2,682,427 | 6/1954 | Bright | 296/77.1 X |
| 3,709,553 | 1/1973 | Churchhill et al. | 296/77.1 X |
| 4,336,964 | 6/1982 | Pivar | 296/77.1 |
| 4,621,859 | 11/1986 | Spicher | 296/77.1 |
| 4,773,694 | 9/1988 | Gerber | 296/77.1 |

Primary Examiner—Joseph Pape

[57] ABSTRACT

A custom fitting closure for golf carts that includes horizontally swinging doors that are framed by a U-shaped members having hinges on their free ends with the hinges mounted on the cart. The doors are covered to protect the rider from the element.

19 Claims, 5 Drawing Sheets

ALUMINUM FRAMED VINYL CLOSURE FOR GOLF CARTS

This application is a continuation-in-part of U.S. patent application Ser. No. 07/959,388, filed on Oct. 13, 1992, and now abandoned.

BACKGROUND-FIELD OF THE INVENTION

This invention relates to Golf Cart closures, specifically to such closures which are installed on golf vehicles for use during the colder seasons.

BACKGROUND-DESCRIPTION OF PRIOR ART

Golf Cart accessory companies and manufactures have provided consumers with closures for use on golf carts. These closures, commonly referred to as winter curtains, provide shelter from the colder seasons of the year, thus allowing more year round playing time for golfers.

All the manufacturers of these closures designed the curtain to completely cover the entire cart, much like a pillow case would cover a pillow. The material used, flexible transparent vinyl and colored plastic material is draped over the top of the golf cart and is hung down along the sides and back. The bulk of the closure is held in place by several metal hooks attached around the bottom perimeter of the golf cart.

Originally all the inventors or manufacturers of these closures designed them very similar in nature, appearance, and function, including the opening by which the passenger would enter the golf vehicle. This opening was comprised of two zippers extending vertically along each side of the golf cart. The two zippers could then be zipped upward to the top, forming the opening or door by which the passenger could enter the cart.

Thus upon entering the golf cart, the passenger is forced to zip open the door and then lower his own head and shoulders low enough to enter under the zipper opening. After seated, the passenger would then need to zip down the curtain to keep the cold air out. This procedure is a nuisance and is very tiresome to a golfer who is attempting to pay 18 holes of golf or more.

Thereafter, one manufacturer named Red Dot Enclosure from Tampa, Fla. created a sliding door enclosure for a golf cart that opened horizontally from back to front. This door closure will fold forward as it slides along a plastic rail mounted on the top of the cart. This is an improvement over the double zipper type in that entry and exit is made slightly easier. Red Dot Enclosure advertises this closure as having Patent Pending status. This closure, however, is cumbersome to open and close since one has to clasp in his hand the bulky folded curtain and pull the folds toward the back of the cart.

The method used to finally seal the door is very inefficient and allows much undesirable cold air to pass inside. My own invention utilizes a rigid horizontally swinging door system with a special C-shaped round tubular frame that makes entering and exiting very comfortable and forms a more air efficient enclosure.

a) The vertical zipper type door closures are difficult to zip up or down. Also, the zippered door is tiresome and monotonous to operate. An average golfer does not like to be bothered with a constant and difficult zipping action necessary to enter and exit the golf cart.

b) In case of warmer weather, the zippered enclosure door must be rolled up to the top and strapped in place in order to receive constant additional cool air. This takes too much time and skill to do thus is not considered a convenient task.

c) Both the zippered door and the curtain door closures are too bulky and non-rigid to keep out gust of cold wind. Any desirable heat buildup inside the enclosure would be lost due to inconvenient and slow manipulation of both door designs.

d) The primary complaint given by users of the zippered door enclosure is that the door opening is so narrow that it is difficult to lower one's head and shoulders low enough to clear the top of the door opening. Zipping up both zippers and therefore opening the entire door would improve slightly the ease of entry, but it would also double the already undesirable zipping action and thus increases the overall pain of entry.

e) All four zippers on each closure, two on the left side and two on the right, are at least 4 feet long. After playing only one full round of golf, or 18 holes, the golfer would have raised and lowered at least one zipper an average of 90 times. That quantity of extra work to play golf is undesirable.

f) The curtain type closure often is difficult to manage unfolding it to its closed position. The small piece of velcro used to supposedly keep the door shut is not successful and difficult to accomplish.

g) The curtain type closure, because of constant folding, makes the clear plastic vinyl unattractive and hard to see through. The folds and wrinkles causes a distorted view. The clear vinyl on the zippered curtain closure also receives the same type damage from attempting to roll up the door.

h) Another manufacturer of a golf cart enclosure, namely Cook Manufacturing Corp in Duncan, Okla., produces a large cagelike aluminum closure that did have hinged doors. The cage was a large square tubing devise with plexiglass panels. It weighed 140 lbs. which made it hard to install and impractical to store and greatly distracted from the beauty of the golf cart. Lengthy assembly and high cost made the purchase of this closure undesirable. Utilizing rigid materials with no flexible parts produced a very squeaky and general noisy closure.

OBJECTS AND ADVANTAGES

Accordingly, besides the objects and advantages of the swinging door described above, several objects and advantages of the same invention are:

(a) to provide a closure which would open in such a fashion that it would constitute the elimination of cumbersome door zippers.

(b) to provide a closure that could easily be ventilated on warmer afternoons without disturbing the clarity and beauty of the transparent flexible vinyl.

(c) to provide a custom closure that fits closer to the contour of the golf cart, thereby giving the passenger better weather protection and giving the cart a much better appearance.

(d) to provide a closure that would allow a passenger the very easiest and comfortable entry and exit.

(e) to provide a closure that would open and close in the most practical and desirable fashion.

(f) to provide a closure that would automatically close and stay closed in an efficient sealed manner.

(g) to provide a closure that would preserve its own neatness, beauty and more importantly, its transparent clarity.

(h) to provide a practical swinging door closure that is very affordable, easily installed and stored, and visibly attractive.

Further objects and advantages are to provide a closure which would open and close in the easiest manner possible, without the use of vertical zippers, which could be used and ventilated without wrinkling the clear vinyl, which would fit the contour of the cart providing better weather protection, which would allow the passenger comfortable entry and exit, which would automatically close and stay sealed, and which would be easily installed, easily stored, inexpensive to manufacture and visually attractive.

DRAWING FIGURES

Figure 7:
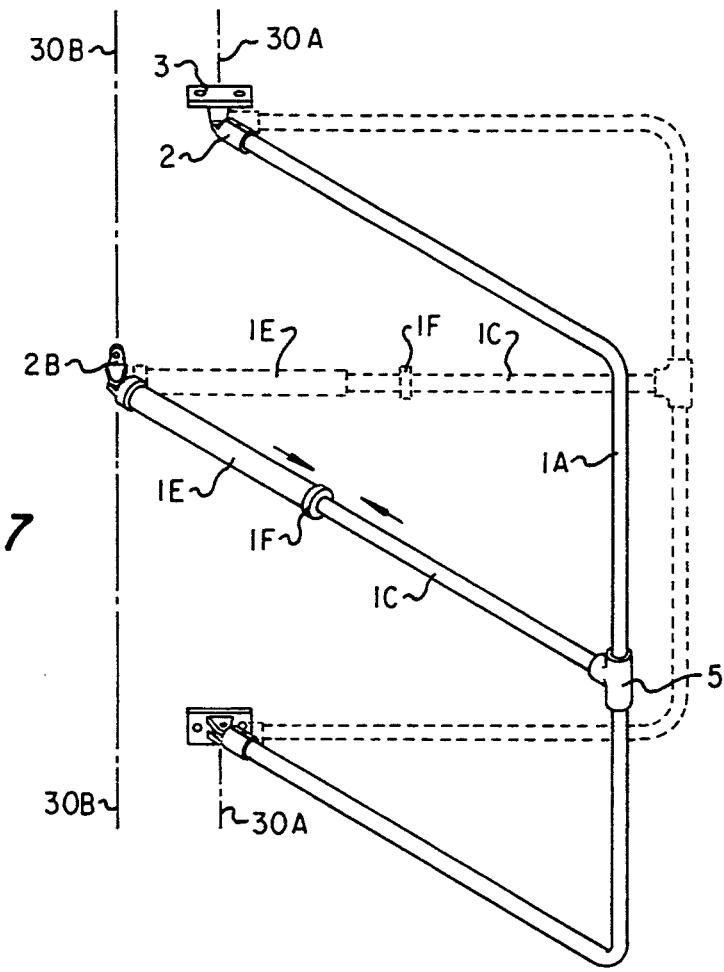
Figure 6:
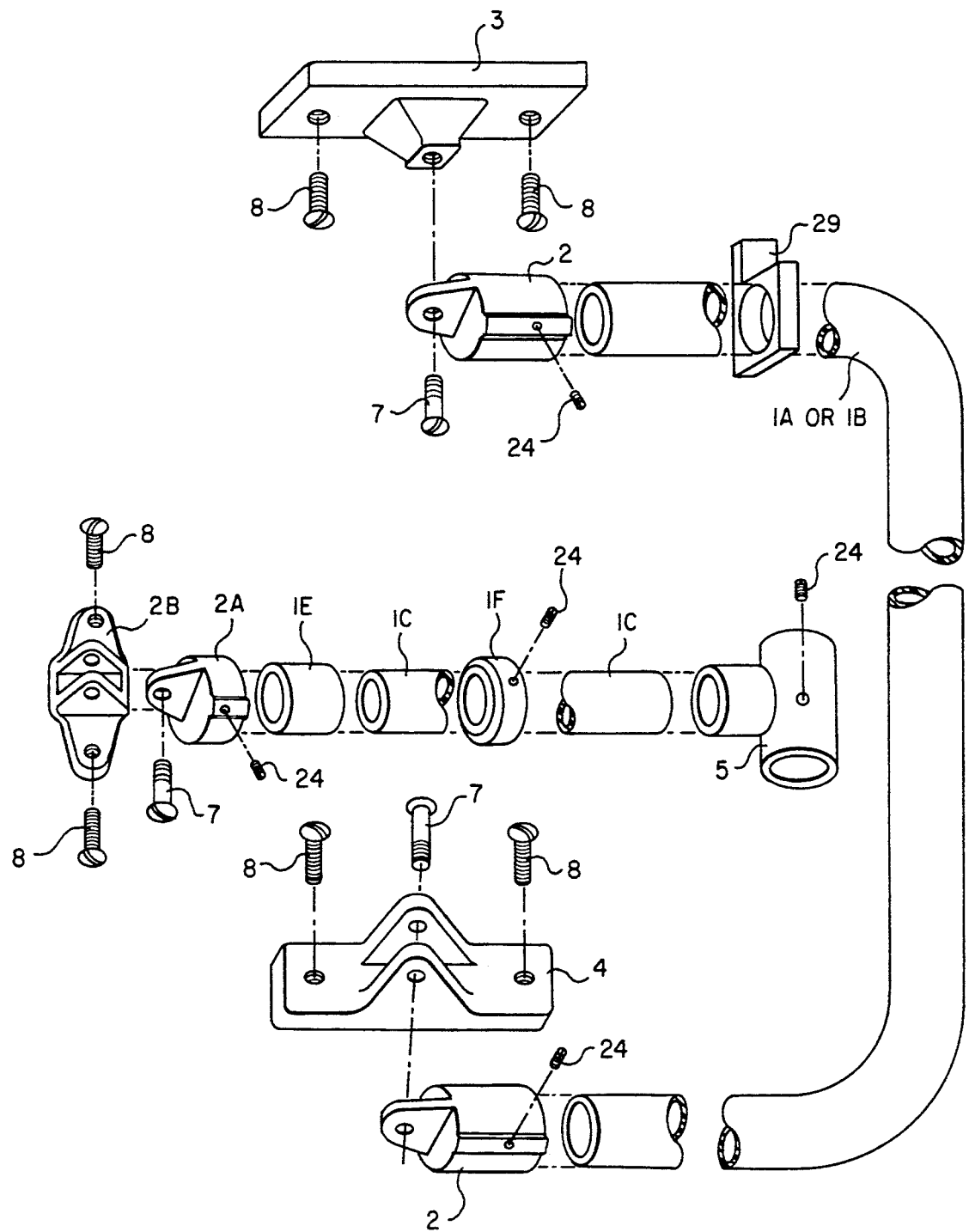
FIG. 6 is a view similar to FIG. 1, but showing another embodiment of the C-shaped member utilized in the invention.

FIG. 7 schematically illustrates the operational positions of the embodiment of FIG. 6.

Figure 1:
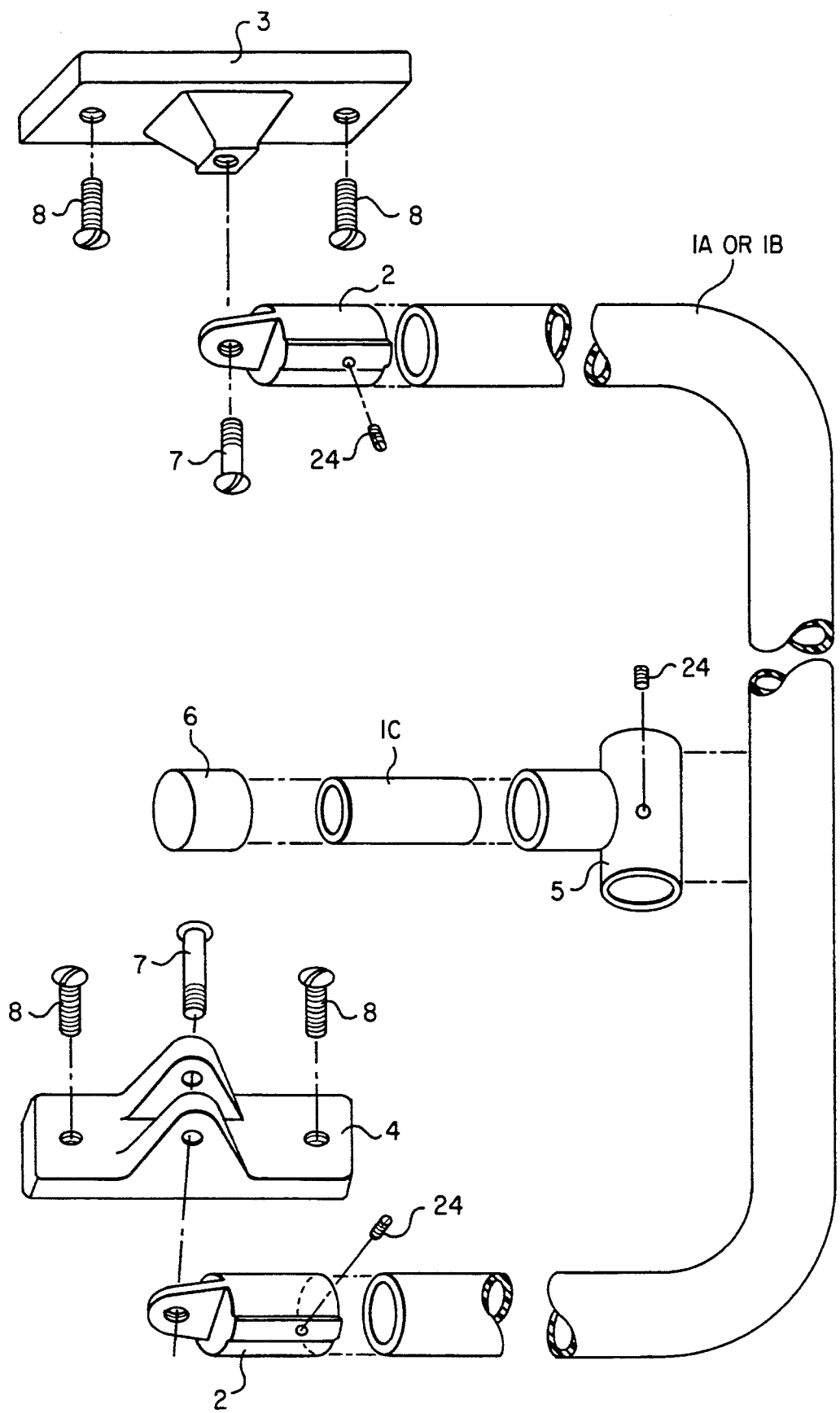
FIG. 1 shows the exploded view of the C-shaped aluminum frame, which forms the perimeter of door closure.
Figure 2:
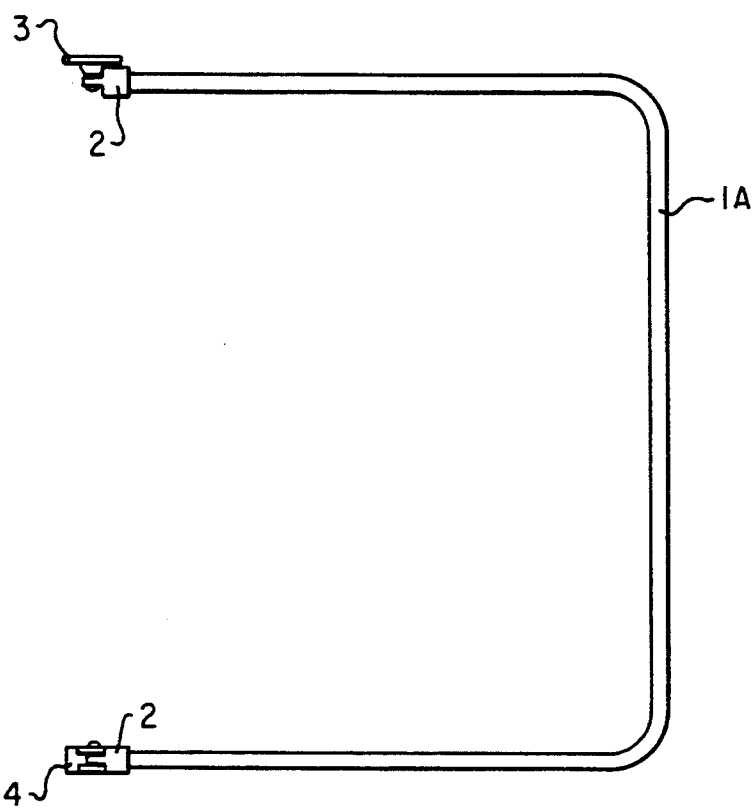
FIG. 2 shows the side view of the C-shaped door frame, which is the main feature of this invention.
Figure 3:
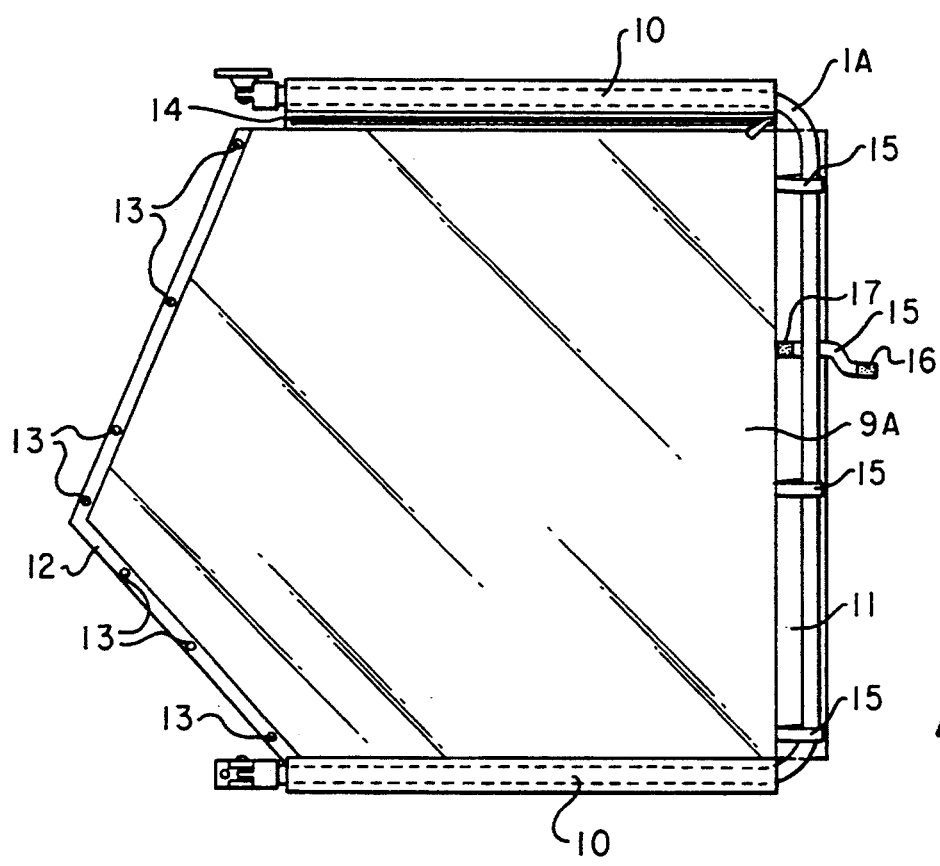
FIG. 3 shows the same C-frame with the clear vinyl attached, forming the actual door closure.
Figure 8:
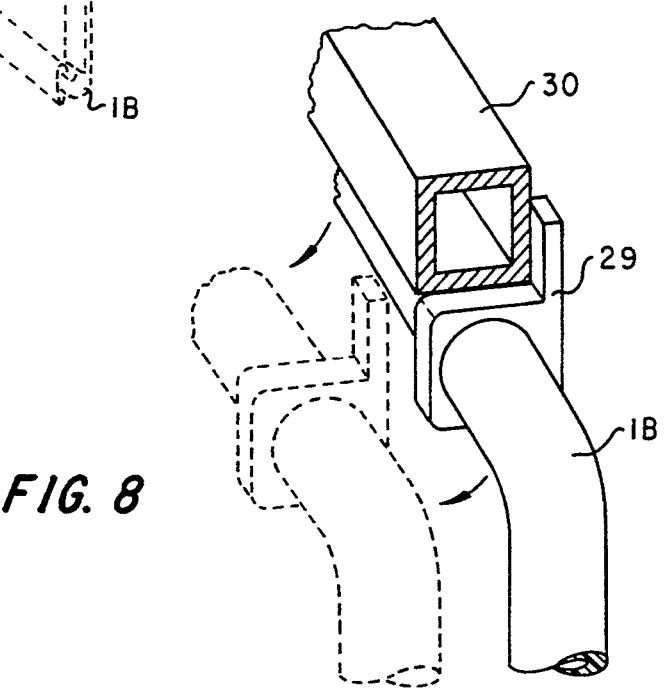

FIG. 8 is a fragmentary view illustrating a door latching arrangement that can be used with either the embodiment of FIG. 1 or FIG. 6.

REFERENCE NUMERALS IN DRAWING

In the drawings, closely related figures have the same number but different alphabetic suffixes.

1A. $\frac{3}{4}$ inch aluminum tubing comprising special C-shaped frame for right side
1B. $\frac{3}{4}$ inch aluminum tubing comprising special C-shaped frame for left side
1C. Right $\frac{3}{4}$ inch aluminum tubing door handle bar
1D. Left $\frac{3}{4}$ inch aluminum tubing door handle bar
1E. $\frac{7}{8}$ inch aluminum tubing
1F. $\frac{3}{4}$ inch adjustable stop collar
2. Eye End, Lexan
2A. $\frac{7}{8}$Eye end, Lexan
2B. Horizontal hinge
3. Mounting Plate, Lexan
4. Hinge, Lexan
5. $\frac{3}{4}$ inch T Coupling, Lexan
6. $\frac{3}{4}$ inch, End Cap
7. $\frac{1}{4}$ Hinge bolt
8. #10 Sheet Metal Screw
9A. Transparent Vinyl Right Side
6B. Transparent Vinyl Left Side
9C. Transparent Vinyl Back Section
10. Pigmented Vinyl Sleeve
11. Pigmented Vinyl Seal 4 inches wide
12. Pigmented Vinyl Border 1 inch wide
13. Metal canvas snaps
14. 36 inch horizontal zipper
15. 1 inch wide elastic material
16. 1 inch wide velcro hook
17. 1 inch wide velcro pad
18. 9/32 screw stud
19. Golf cart
19A. Gold cart top frame
20. Fold down line for window
21. Bungle cord for auto door
22A. Hard rubber door stop 9 inches right
22B. Hard rubber door stop 2 inches left
23. Metal gripper clip for door lock
24. Set screw
25A. $\frac{1}{4}''\times\frac{1}{2}''$ Eye Bolt Right Side
25B. $\frac{1}{4}''\times\frac{1}{2}''$ Eye Bolt Left Side
26. $\frac{1}{4}''\times 2\frac{1}{2}''$ Bolt and nut
27. Outside edge of back closure
28. Golf cart windshield
29. Door lock

DESCRIPTIVE —FIG. 1 to 5

Figure 4:
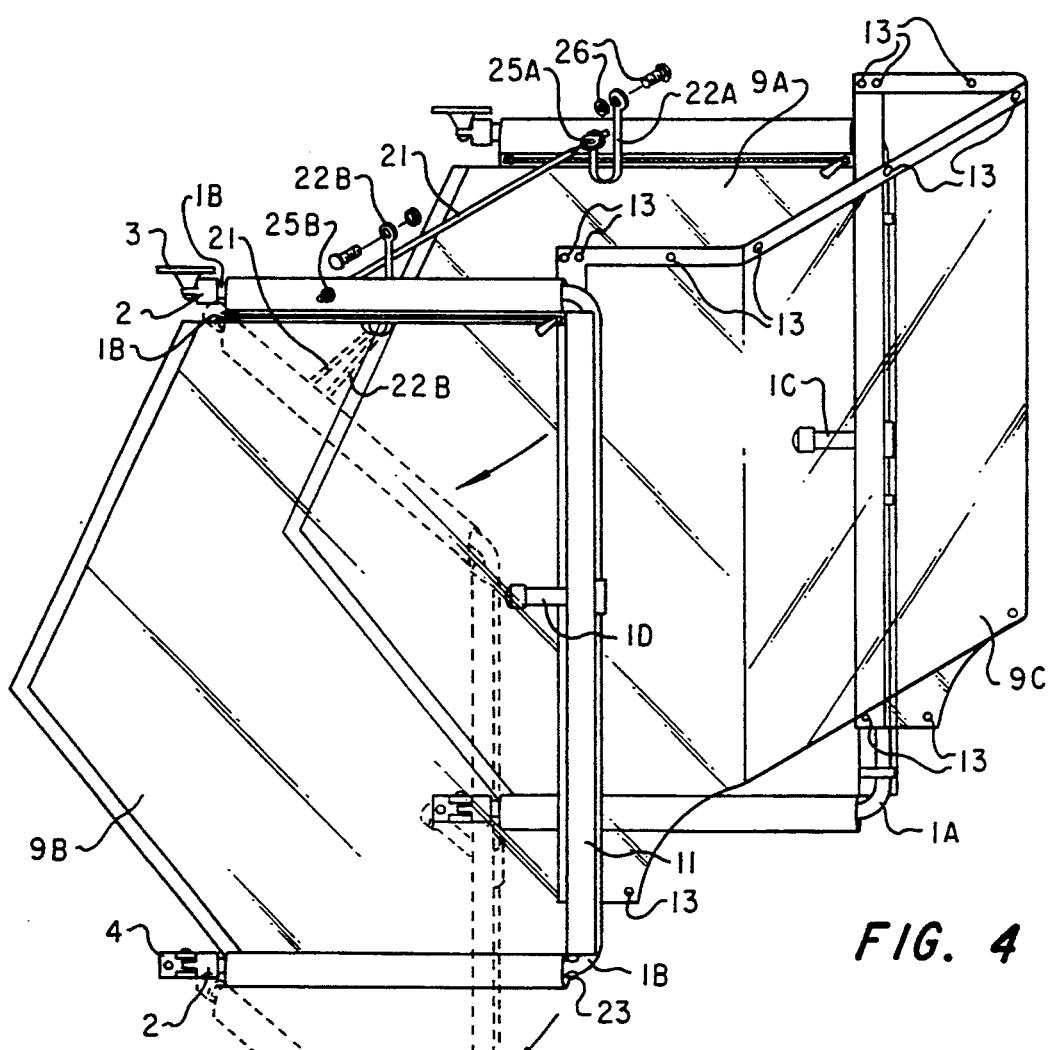
FIG. 4 shows the left and right doors positioned and sealed against the back section and also demonstrates the left, or driver's side door as it swings open.
Figure 5:
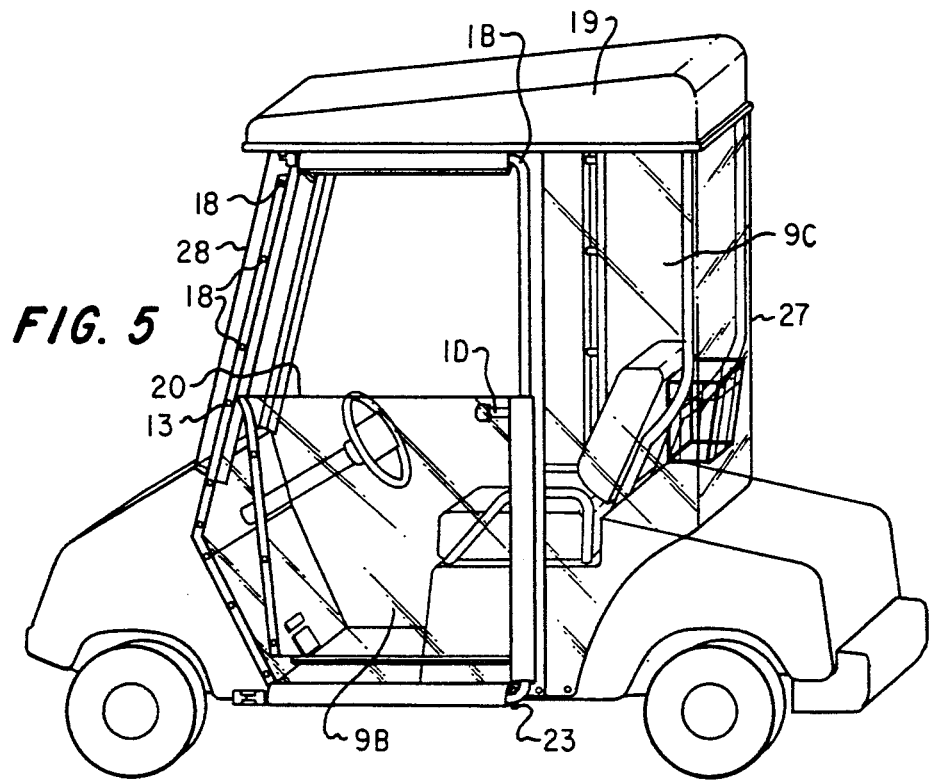
FIG. 5 shows the complete closure fastened to a golf cart.

A typical embodiment of the complete closure of the present invention is illustrated in FIGS. 4 and 5. The main element of the invention, however, is shown in an exploded side view in FIG. 1. The $\frac{3}{4}''$ diameter anodized aluminum tubing 1A is carefully bent into a 90% angle at two locations, one upper and one lower, as shown in FIG. 1. Bending the tubing at the appropriate places will cause it to fit any golf cart desired. The horizontal upper and lower portions of the frame 1A are approximately 2'9". The longer vertical portion of the frame 1A is approximately 4'9".

Both the lower and upper ends of frame 1A insert into lexan eye ends 2 which is fastened by set screw 24. The upper eye end 2 is fastened into mounting plate 3 by $\frac{1}{4}''$ hinge bolt 7. The mounting plate 3 is fastened into the golf cart 19 by 2 sheet metal screws 8, FIG. 1. The FIG. 5 union of eye end 2 and mounting plate 3 form the upper hinge by which the frame 1A can horizontally swivel. The lower eye end 2 is fastened to lexan hinge 4 by $\frac{1}{4}''$ hinge bolt 7. Hinge 4 is fastened to the lower side frame of the golf cart 19, FIG. 5 by 2 sheet metal screws 8. The union of lower eye end 2 and hinge 4 form the lower hinge mechanism by which the frame 1A can horizontally swivel. It should be mentioned that the tubing 1A, Eye End 2, Mounting Plate 3, and Hinge 4, have heretofore been used in the design of boat window awnings. These materials 1A, 2, 3, & 4 are used to comprise roof type partial closures, but have never, to this inventor's knowledge, been used to produce a horizontal swinging door for golf carts or any vehicles.

However, sewed horizontally in between the sleeve 10 and transparent vinyl 9A is a zipper 14 approximately 36 inches long. This zipper 14 is used for the sole purpose of allowing a vent type window to be used if needed. The upper 3 metal canvas snaps 13 and the upper 2 velcro hooks 16 must be released, along with the aforementioned zipper 14, in order to fold down the upper half of the transparent vinyl 9A, thereby allowing the vent window.

One important illustration of FIG. 4 demonstrates how the transparent vinyl back section 9C fits and seals against the vertical edge of the frame 1B and border vinyl 11. The dotted lines making up a ghost image door 1B demonstrates the ability of the door to horizontally open. Each door frame 1A and 1B are connected by a 36 inch bungie cord 21 with hooks at either end. This bungie 21 is attached to steel eye bolts 25 that are permanently affixed to the frames 1A and 1B. The bungle 21 insures automatic sealing into the back vinyl border. When the door is in its closed position the metal gripper clip 23 keeps the frame 1B from popping open at an undesired time. Also attached to eyebolt 25 is a hard 9 inch rubber strap 22A that acts as a door stop when attached to the golf cart top 19, FIG. 5.

FIG. 5 illustrates how the complete Easy Door Enclosure invention would appear on a golf cart, in this case, with the vent window open. This closure works in conjunction with the existing hard plexiglass windshield 28.

OPERATION—FIGS. 4 AND 5

After initial installation of the Easy Door Enclosure is made by the Seller, the user can easily remove or replace the closure in about ten minutes. Removal of the 4 hinge bolts 7, and unsnapping the metal canvas snaps 13 will remove the entire closure.

FIG. 4 demonstrates the opening action of the special C-shaped frame 1B. The upper hinge 2, 3 and lower hinge 4, 2 provide the door frame 1 B with 180 degrees horizontal turning radius ability. Attaching the hard rubber door stop 22A from the eye bolt 25 to the golf cart top 19, FIG. 5 will ultimately stop the opening to about 60 degrees. The bungie cord 21, when attached to eye bolts 25A and 25B acts as an automatic door closer and helps keep both doors 1A, 1B sealed.

FIG. 5 shows the vent window 20 in full use. The vinyl 9B is held in place at its folded line 20 by canvas snap 13 and the door handle 1D.

The embodiment shown in FIGS. 6 and 7, provides a somewhat stronger door, although more expensive. The additional strength is gained through the use of a tubular member 1 E that is arranged in telescoping relationship with the door handle 1C.

A stop collar 1F is located on the tube 1C to limit the travel of the tube 1E in one direction along the handle 1C. The engagement of the end of the member 1E with the stop collar 1F limits movement of the door away from the cart.

The free end of the tube 1E is connected to a hinge that is formed by the eye end 2A and the horizontal hinge 2B. The hinge 2B is mounted on the golf cart as can be seen in FIG. 7, an axis 30B of the hinge 2B is not axially aligned with axis 30A of the upper and lower hinges 3 and 4. Accordingly, when the door is moved between the positions shown in solid and dash lines in FIG. 7, the radii from the axes are different. When such movement occurs, the tubes 1C and 1E telescope to adjust for the different radii.

The provision of the telescoping extension also provides a convenient support for the vinyl door cover 9B when it is folded down from the top as illustrated in FIG. 5.

FIG. 6 also illustrates a door latch or lock 29. The lock 29 is slipped over the tube 1A near the golf cart top or roof 19. In the view of FIG. 8, the lock 29 is shown in locked position in solid lines and in the unlocked position in dash lines. The detailed view of FIG. 8 shows a tang on the lock engaging a portion of the roof frame 30. It is not necessary to use a lock with moving parts because the door can be easily moved downwardly sufficiently to allow the tang to move past the frame 30. Despite the ease of locking and unlocking the door, the lock securely holds the door in the closed position.

SUMMARY, RAMIFICATION, AND SCOPE

Accordingly the reader will see that the Easy Door Enclosure inventing provides the user with the most convenient and practical manner of entry and exit. The closure complete is light weight, about 10 lbs., and can be reinstalled by the golfer in about 5 minutes, The flexible material used to form the enclosure's doors and back section is 95% transparent giving a non-distracting beauty and gives perfect interior to exterior visibility which is important for safety. The Easy Door Enclosure has additional advantages in that:

- it provides a closure that eliminates the need for undesirable vertical door zippers.
- it provides a closure that can be easily ventilated on warmer afternoons without disturbing the clarity and beauty of the transparent flexible vinyl.
- it provides a closure that will automatically close and lock itself in a sealed position so as to give the golfer a maintenance free round of golf.
- it provides a closure that is custom fit and will not sag or wrinkle due to its own design, namely because of the special C-shaped frame and the elastic straps that keep constant low horizontal tension on the side doors.
- it provides a closure that gives better weather protection due to the excellent sealing ability of the rigid C-frame.
- it provides a closure that can be stored, for example, on a user's interior garage wall and thereby retain its non-wrinkled appearance.
- it provides a very economical swinging door system by virtue of eliminating the need for costly and heavy welded square tubing door frames that require welding large steel hinges, and an abundance of fastening devices.

Although the description above contains many specificities, these should not be construed as limiting the scope of the invention but as merely providing an illustration of the presently preferred embodiments of this invention. For example, the closure attempting to fit other vehicles such as tractors, turf vehicles, or small security vehicles, can have other shapes including circular, oval, trapezoidal or triangular, etc. Other materials to form the inventor's more common C-shaped door frame could be used such as plastic, plastic varieties, or other light weight metal alloys.

Thus the scope of the invention should be determined by the appended claims and their equivalents, rather than by the examples given.

I claim:

1. A door assembly and golf cart comprising, in combination:
    a golf cart including a front, a rear, left and right sides, a passenger seat located between said front and rear and between said sides, and a top located on said cart generally over said seat, said door assembly being located on one side of said cart and including
    a generally C-shaped relatively rigid frame having top and bottom ends;
    a top hinge connected to said top end and connected to the top of said golf cart at said one side;
    a bottom hinge connected to said bottom end and connected to the golf cart relatively below said top end, whereby said frame is pivotal relative to the golf cart for providing access to said seat; and, a flexible cover connected to said frame forming a covered door.

2. The combination of claim 1 wherein said cover includes a transparent portion located adjacent to said cart top.

3. The combination of claim 1 and also including a handle member having one end connected to said frame intermediate said ends and projecting generally parallel to said top and bottom ends.

4. The combination of claim 2 and also including spaced, releasable fasteners located on said cart, on said cover, and on said frame adjacent to said cart top for releasably connecting said cover to said frame, whereby releasing said fasteners permits lowering a portion of said cover.

5. The combination of claim 1 and also including releasable fasteners located on said cover and cart between said top and bottom ends for connecting said cover to said cart.

6. The combination of claim 1 and including a second door assembly located on the other side of said cart.

7. The combination of claim 6 and also including resilient closure members having ends attached to said door assembly and other ends attached to said golf cart urging said doors toward a closed position adjacent to said cart.

8. The combination of claim 1 and also including a lock member mounted on said frame adjacent to said top and having a tang projecting upwardly and selectively engagable with said top to hold said door in a closed position.

9. The combination of claim 3 and also including a generally tubular member having a first end slidingly encircling a portion of said handle member and a second end having a hinge thereon, said hinge being mounted on said golf cart generally between said top and bottom hinges.

10. The combination of claim 9 and also including a stop collar mounted on said handle member for engaging said tubular member to limit the relative movement between said handle member and tubular member in one direction thereby limiting the movement of said door away from said cart.

11. A door assembly and golf cart comprising, in combination:
a golf cart including a front, a rear, left and right sides, a passenger seat located between said front and rear and between said sides, and a top located on said cart generally over said seat, said door assembly being located on the sides of said cart and including
generally C-shaped frames having top and bottom ends;
a top hinge connected to each said top end and connected to the top of said golf cart at sides;
a bottom hinge connected to each said bottom end and connected to the golf cart relatively below said top ends, whereby said frames are pivotal relative to the golf cart for providing access to said seat;
a flexible cover connected to each said frame forming covered doors;
a handle member having one end connected to said frames intermediate said ends and projecting generally parallel to said top and bottom ends; and,
spaced, releasable fasteners located on said cart, on said covers, and on each said frame adjacent to said cart top for releasably connecting said covers to said frames, whereby releasing said fasteners permits lowering a portion of each said cover.

12. The combination of claim 11 wherein said each cover includes a transparent portion located adjacent to said cart top.

13. The combination of claim 12 and also including releasable fasteners located on said covers and cart between said top and bottom ends for connecting said covers to said cart.

14. The combination of claim 13 and also including resilient closure members having ends attached to said door assemblies and other ends attached to said golf cart urging said doors toward closed positions adjacent to said cart.

15. The combination of claim 14 and also including a lock member mounted on each said frame adjacent to said top and each having a tang projecting upwardly and selectively engagable with said top to hold said doors in a the closed position.

16. The combination of claim 11 and also including two generally tubular members, each having a first end slidingly encircling a portion of each said handle member and having second ends having a hinge thereon, each said hinge being mounted on said golf cart generally between said top and bottom hinges.

17. The combination of claim 16 and also including a stop collar mounted on each said handle member for engaging said tubular members to limit the relative movement between said handle member sand tubular members in one direction thereby limiting the movement of said doors away from said cart.

18. The combination of claim 15 and also including two generally tubular members, each having a first end slidingly encircling a portion of each said handle member and having second ends having a hinge thereon, each said hinge being mounted on said golf cart generally between said top and bottom hinges.

19. The combination of claim 18 and also including a stop collar mounted on each said handle member for engaging said tubular members to limit the relative movement between said handle member sand tubular members in one direction thereby limiting the movement of said doors away from said cart.

* * * * *